US009297410B2

(12) United States Patent
Kota et al.

(10) Patent No.: US 9,297,410 B2
(45) Date of Patent: Mar. 29, 2016

(54) BEARING ASSEMBLY FOR A DRILLING TOOL

(71) Applicants: Smith International, Inc., Houston, TX (US); Sandra J. Grebe, Tomball, TX (US)

(72) Inventors: Ravikiran Kota, Houston, TX (US); Somasundaram Valliyappan, Spring, TX (US); H. Andrew Grebe, Tomball, TX (US)

(73) Assignee: SMITH INTERNATIONAL, INC., Houston, TX (US)

( * ) Notice: Subject to any disclaimer, the term of this patent is extended or adjusted under 35 U.S.C. 154(b) by 2 days.

(21) Appl. No.: 14/144,637

(22) Filed: Dec. 31, 2013

(65) Prior Publication Data

US 2014/0185972 A1    Jul. 3, 2014

Related U.S. Application Data

(60) Provisional application No. 61/747,398, filed on Dec. 31, 2012.

(51) Int. Cl.
*F16C 17/02* (2006.01)
*F16C 37/00* (2006.01)
*E21B 4/00* (2006.01)

(52) U.S. Cl.
CPC ............... *F16C 17/02* (2013.01); *F16C 37/002* (2013.01); *E21B 4/003* (2013.01); *F16C 2352/00* (2013.01)

(58) Field of Classification Search
CPC .... F16C 37/002; F16C 17/02; F16C 2352/00; E21B 4/003; E21B 7/201; E21B 7/068; E21B 10/36

USPC ........... 384/91–92, 95, 97, 99, 114, 123, 316, 384/378, 625, 93; 175/107, 296, 323, 325.5
See application file for complete search history.

(56) References Cited

U.S. PATENT DOCUMENTS

| | | | | |
|---|---|---|---|---|
| 1,612,889 | A | * | 1/1927 | Smith ............................ 175/57 |
| 1,641,206 | A | * | 9/1927 | Smith .......................... 175/322 |
| 1,785,086 | A | * | 12/1930 | Hauk ............................ 175/317 |
| 2,589,534 | A | | 3/1952 | Buttolph |
| 2,794,617 | A | * | 6/1957 | Yancey ......................... 175/323 |
| 3,194,331 | A | | 7/1965 | Arnold |
| 3,285,678 | A | | 11/1966 | Garrett et al. |
| 3,318,397 | A | * | 5/1967 | De Wayne ...................... 175/73 |
| 3,656,565 | A | * | 4/1972 | Fox ............................... 175/323 |
| 3,705,501 | A | * | 12/1972 | Minks ........................... 464/160 |
| 3,712,392 | A | | 1/1973 | Gorgendiere |

(Continued)

FOREIGN PATENT DOCUMENTS

| | | | |
|---|---|---|---|
| EP | 277433 | A1 | 8/1988 |
| GB | 877701 | A | 9/1961 |
| JP | 2006272392 | A * | 10/2006 |

*Primary Examiner* — Marcus Charles

(57) ABSTRACT

A bearing assembly for a drilling tool. A radial bearing assembly for use in a drilling tool may include a bushing having a generally cylindrical body with an inner surface. The radial bearing assembly may also include a sleeve configured to couple to a rotatable shaft of the drilling tool and configured to rotate within the bushing. The sleeve has (i) a plurality of spiral projections extending laterally in a direction away from a longitudinal axis of the radial bearing assembly and (ii) a plurality of flow paths, where a flow path of the plurality of flow paths is defined between a pair of adjacent spiral projections.

17 Claims, 9 Drawing Sheets

(56) References Cited

U.S. PATENT DOCUMENTS

| | | | |
|---|---|---|---|
| 4,049,066 A * | 9/1977 | Richey | 175/323 |
| 4,452,307 A * | 6/1984 | Horton | 166/174 |
| 4,549,613 A * | 10/1985 | Case | 175/325.2 |
| 4,664,206 A | 5/1987 | Butler | |
| 4,890,682 A * | 1/1990 | Worrall et al. | 175/61 |
| 5,156,223 A * | 10/1992 | Hipp | 175/296 |
| 5,522,467 A | 6/1996 | Stevens et al. | |
| 5,810,100 A | 9/1998 | Samford | |
| 6,012,744 A | 1/2000 | Wilson | |
| 6,056,073 A | 5/2000 | Boulet | |
| 6,062,326 A * | 5/2000 | Strong et al. | 175/402 |
| 6,290,002 B1 * | 9/2001 | Comeau et al. | 175/73 |
| 6,412,574 B1 * | 7/2002 | Wardley et al. | 175/7 |
| 6,435,275 B1 | 8/2002 | Kirk et al. | |
| 6,666,267 B1 | 12/2003 | Charlton | |
| 7,428,938 B2 * | 9/2008 | Marshall | 175/414 |
| 8,087,910 B2 * | 1/2012 | Yajima | 417/478 |
| 8,191,655 B2 * | 6/2012 | Declute-Melancon | 175/322 |
| 8,281,635 B2 * | 10/2012 | Beppu | 72/283 |
| 2003/0136587 A1 | 7/2003 | Boulet | |
| 2004/0060699 A1 | 4/2004 | Rastegar | |
| 2007/0267221 A1 * | 11/2007 | Giroux et al. | 175/57 |
| 2010/0032170 A1 * | 2/2010 | Howett et al. | 166/383 |
| 2010/0236829 A1 | 9/2010 | Yao | |
| 2011/0048803 A1 | 3/2011 | Robson et al. | |
| 2011/0114307 A1 | 5/2011 | Casassa et al. | |
| 2011/0268378 A1 | 11/2011 | Modtland et al. | |
| 2012/0138289 A1 | 6/2012 | Begley et al. | |

* cited by examiner

BEARING ASSEMBLY FOR A DRILLING TOOL

CROSS-REFERENCE TO RELATED APPLICATIONS

This application claims the benefit of related U.S. Provisional Application Ser. No. 61/747,398 filed on Dec. 31, 2012, titled, "Bearing Assembly for a Drilling Tool," to Ravikiran Kota et al., the disclosure of which is incorporated by reference herein in its entirety.

BACKGROUND

The following descriptions and examples do not constitute an admission as prior art by virtue of their inclusion within this section.

Drilling tools, such as drilling motors, may be used to provide rotational force to a drill bit when drilling earth formations. Drilling motors used for this purpose may be driven by drilling fluids pumped from surface equipment through a drill string. This type of motor may be referred to as a mud motor. In use, the drilling fluid may be forced through the mud motor, which may extract energy from the flow to provide rotational force to a drill bit located below the mud motor. A mud motor may include a positive displacement motor (PDM) or a turbodrill.

For some drilling tools, radial bearings may be used to prevent vibration of a shaft within the drilling tool due to misalignment. In addition, the radial bearing may be used to mitigate effects of side loads in the drilling tool during directional drilling. Each radial bearing may include a sleeve mounted to the shaft so that the sleeve and shaft rotate together. Each radial bearing may also include a bushing disposed coaxially around the sleeve, where the bushing may be configured to frictionally engage an inner wall of a housing of the drilling tool to prevent the bushing from rotating and to allow the sleeve to rotate within the bushing.

Friction in contact areas of the radial bearing may generate increased levels of heat during rotation of the shaft. High operating temperatures often lead to physical failure of radial bearing components. While a flow of drilling fluid through the radial bearing may at least partially inhibit damage to the bushing and/or the sleeve, drilling fluid which passes too quickly may have insufficient time to dissipate the heat produced in the radial bearing.

At elevated temperature levels, frictional welding may occur between the bushing and the sleeve, causing the rotation of the shaft to be arrested. Further, at elevated temperature levels, coatings along the bushing and/or the sleeve, such as those made of an elastomeric material, may begin to crack. Due to certain designs of radial bearings, the drilling fluid may have insufficient time to remove abrasive particles in the contact areas, such that the abrasive particles may rip or cause a chunking of the coatings on the bushing and/or the sleeve. As a result, drilling tool components positioned near the radial bearing may experience increased erosion due to the quick-passing drilling fluid.

In addition, continuous friction in contact areas of the radial bearing may generate excessive wear of the radial bearing components. For example, coatings of the bushing and/or the sleeve may wear out, leading to a wearing out of the bushing and/or the sleeve themselves. If components of the radial bearing are sufficiently worn, then the shaft may be positioned off-center within the drilling tool. The off-center shaft may experience increased vibration and the misaligned system may contact against the housing of the drilling tool. In such a scenario, the shaft may incur damage and eventually fracture.

SUMMARY

Described herein are one or more implementations of various technologies for a bearing assembly for a drilling tool. In one implementation, a radial bearing assembly for use in a drilling tool may include a bushing having a generally cylindrical body with an inner surface. The radial bearing assembly may also include a sleeve configured to couple to a rotatable shaft of the drilling tool and configured to rotate within the bushing. The sleeve has (i) a plurality of spiral projections extending laterally in a direction away from a longitudinal axis of the radial bearing assembly and (ii) a plurality of flow paths, where a flow path of the plurality of flow paths is defined between a pair of adjacent spiral projections.

In another implementation, a radial bearing assembly for use in a drilling tool may include a bushing having a generally cylindrical body with an inner surface. The bushing also has (i) a plurality of spiral projections extending laterally inwardly in a direction toward a longitudinal axis of the radial bearing assembly and (ii) a plurality of flow paths, where a flow path of the plurality of flow paths is defined between a pair of adjacent spiral projections. The radial bearing assembly may also include a sleeve configured to couple to a rotatable shaft of the drilling tool and configured to rotate within the bushing.

Described herein are also one or more implementations of various technologies for a turbodrill, which may include a housing having a housing bore extending therethrough. The turbodrill may also include a rotatable shaft positioned in the housing bore. The shaft is rotatable relative to the housing. The housing, housing bore and rotatable shaft have a common longitudinal axis. The turbodrill may further include a first radial bearing assembly, which may include a first bushing having a generally cylindrical body with a first inner surface. The first radial bearing assembly may also include a first sleeve configured to couple to the shaft and configured to rotate within the first bushing. The first sleeve has (i) a plurality of first spiral projections extending laterally outwardly in a direction away from the longitudinal axis and (ii) a plurality of first flow paths, where a first flow path of the plurality of first flow paths is defined between a pair of adjacent first spiral projections.

In another implementation, the turbodrill may include a housing having a housing bore extending therethrough. The turbodrill may also include a rotatable shaft positioned in the housing bore. The shaft is arranged and designed to rotate relative to the housing. The housing, housing bore and rotatable shaft have a common longitudinal axis. The turbodrill may further include a radial bearing assembly, which may include a bushing having a generally cylindrical body with an inner surface, the bushing also having (i) a plurality of spiral projections extending laterally inwardly in a direction toward the longitudinal axis and (ii) a plurality of flow paths, where a flow path of the plurality of flow paths is defined between a pair of adjacent spiral projections. The radial bearing assembly may also include a sleeve configured to couple to the rotatable shaft and configured to rotate within the bushing.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
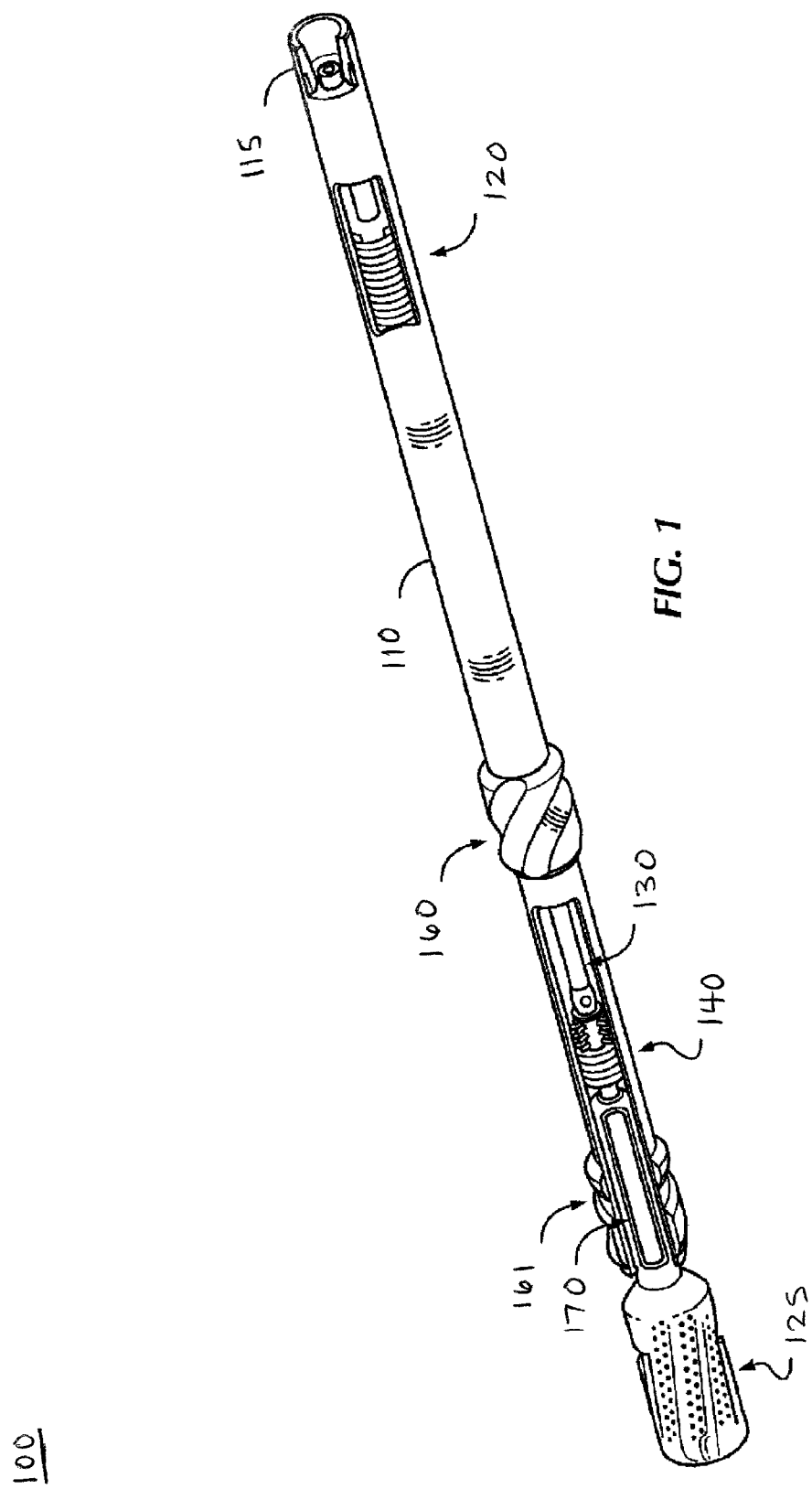
FIG. 1 illustrates a view of a turbodrill in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the terms "up" and "down"; "upper" and "lower"; "upwardly" and downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

The following paragraphs provide a brief summary of various technologies and techniques directed at a bearing assembly for a drilling tool described herein.

In one implementation, a first radial bearing assembly may be disposed in a housing bore, where it may be positioned between a shaft and an inner wall or surface of a housing. The shaft, housing bore and housing may be have a common (centralized) longitudinal axis. The first radial bearing assembly may include a sleeve coupled or mounted to the shaft, such that the sleeve and the shaft may rotate together. The first radial bearing assembly may also include a bushing disposed coaxially around the sleeve, where the bushing may be configured to frictionally engage the inner wall or surface of the housing. In such a configuration, the bushing may be prevented from rotating, allowing the sleeve to rotate within the bushing. The first radial bearing assembly may also include a clearance or radial space located between an outer diameter of the sleeve and an inner diameter of the bushing.

The bushing may have a generally cylindrical body with an inner surface. The sleeve may also have a generally cylindrical body for coupling or mounting to the shaft, where the sleeve may include a plurality of spiral projections extending generally laterally outwardly from the longitudinal axis.

Each spiral projection may include an abutment surface, where the abutment surface may represent an outermost diameter of each spiral projection, as measured laterally from the longitudinal axis. In one or more implementations, a plurality of or all of the points of the abutment surface, for an entire length of the spiral projection, may lie along the outermost diameter for the spiral projection. Accordingly, the abutment surface may have a rounded, arc shape. In one or more implementations, the abutment surface may have rounded edges. A plurality of flow paths may be formed along the outer surface of the sleeve, where each flow path may be formed between a pair of adjacent spiral projections. The flow paths may be configured to allow drilling fluid to flow between the spiral projections.

In lieu of, or in addition to, the first radial bearing assembly, a second radial bearing assembly may be disposed in the housing bore. The second radial bearing assembly may include a sleeve and a bushing which may be positioned relative to each other similarly to the first radial bearing assembly. The sleeve may have a generally cylindrical body with an outer surface. The bushing may also have a generally cylindrical body with an inner surface, where the bushing may include a plurality of spiral projections extending generally laterally inwardly toward the longitudinal axis. In one or more implementations, the spiral projections may extend inwardly in a perpendicular direction towards the longitudinal axis.

Each spiral projection of the bushing of the second radial bearing assembly may include an abutment surface, where the abutment surface may represent an innermost diameter of each spiral projection, as measured laterally to the longitudinal axis. In one or more implementations, a plurality of or all of the points of the abutment surface, for an entire length of the spiral projection, may lie along the innermost diameter for the spiral projection.

A plurality of flow paths may be formed along the inner surface of the bushing, where each flow path may be formed between a pair of adjacent spiral projections. The flow paths may operate and may be arranged similarly to flow paths of the first radial bearing assembly.

Various implementations described above will now be described in more detail with reference to FIGS. 1-9. The following implementations focus primarily on turbodrills. However, those skilled in the art will appreciate that bearing assemblies as disclosed herein may be similarly used in other drilling tools, such as a positive displacement motor (PDM).

Turbodrill Using a Radial Bearing

FIG. 1 illustrates a view of a turbodrill 100 in connection with implementations of various techniques described herein. A housing 110 includes an uphole connection 115 to couple to a drill string. Turbine stages 120 are disposed within the housing 110 and may be used to rotate a shaft 130. At a downhole end portion of the turbodrill 100, a drill bit 125 may be attached to the shaft 130 by a downhole connection (not shown). In addition, stabilizers 160 and 161 may be disposed on the housing 110 to help keep the turbodrill 100 centered within a wellbore.

The turbodrill 100 may use turbine stages 120 to provide rotational force to the drill bit 125. The turbine stages 120 may consist of one or more non-moving stator blades and a rotor assembly having rotating blades mechanically linked to the shaft 130. The turbine stages 120 may be designed such that the blades of the stator stages direct a flow of drilling fluid into corresponding rotor blades to provide rotation to the shaft 130, where the shaft 130 ultimately couples to and drives the drill bit 125. Thus, the high-speed drilling fluid flowing into the rotor blades may cause the rotor and the drill bit to rotate with respect to the housing 110. A portion of the turbodrill 100 in which the turbine stages 120 are located may be called a power section, where the power section may also include other components used to drive the drill bit 125.

While providing rotational force to the shaft 130, the turbine stages 120 may also produce a downhole axial force, or thrust, from the drilling fluid. The downhole thrust, however, may produce a higher weight on bit (WOB) than is needed for operation of the turbodrill 100. To mitigate the effects of excess thrust in the turbodrill 100, thrust bearings 140 may be provided. The thrust bearings 140 may include steel roller bearings, polycrystalline diamond compact ("PDC") surface bearings, or any other implementation known to those skilled in the art. A portion of the turbodrill 100 in which the thrust bearings 140 are located may be called a bearing section. The bearing section may also include bent housing and bearings used to mitigate excess load, where the bearing section is located downhole relative to the power section.

In one scenario, the power section and the bearing section may each include radial bearings, where the radial bearings may help keep the shaft 130 concentric within the housing 110. In particular, the radial bearings may be used to prevent vibration of the shaft 130 due to misalignment or to mitigate effects of side loads during directional drilling. For example, the bearing section of the turbodrill 100 may include radial bearings 170 provided between the shaft 130 and the housing 110. The cutaway of FIG. 1 only shows radial bearings 170 with respect to the bearing section. However, one of ordinary skill in the art will readily recognize that the power section may also have radial bearings disposed therewith. Each radial bearing 170 may include a sleeve mounted to the shaft 130 so that the sleeve and shaft 130 rotate together. Each radial bearing 170 may also include a bushing disposed coaxially around the sleeve, where the bushing may be configured to frictionally engage an inner wall of the housing 110 to prevent the bushing from rotating and to allow the sleeve to rotate within the bushing. Each radial bearing 170 may also include a gap between the sleeve and the bushing, referred to as a clearance.

First Radial Bearing Assembly

Figure 2:
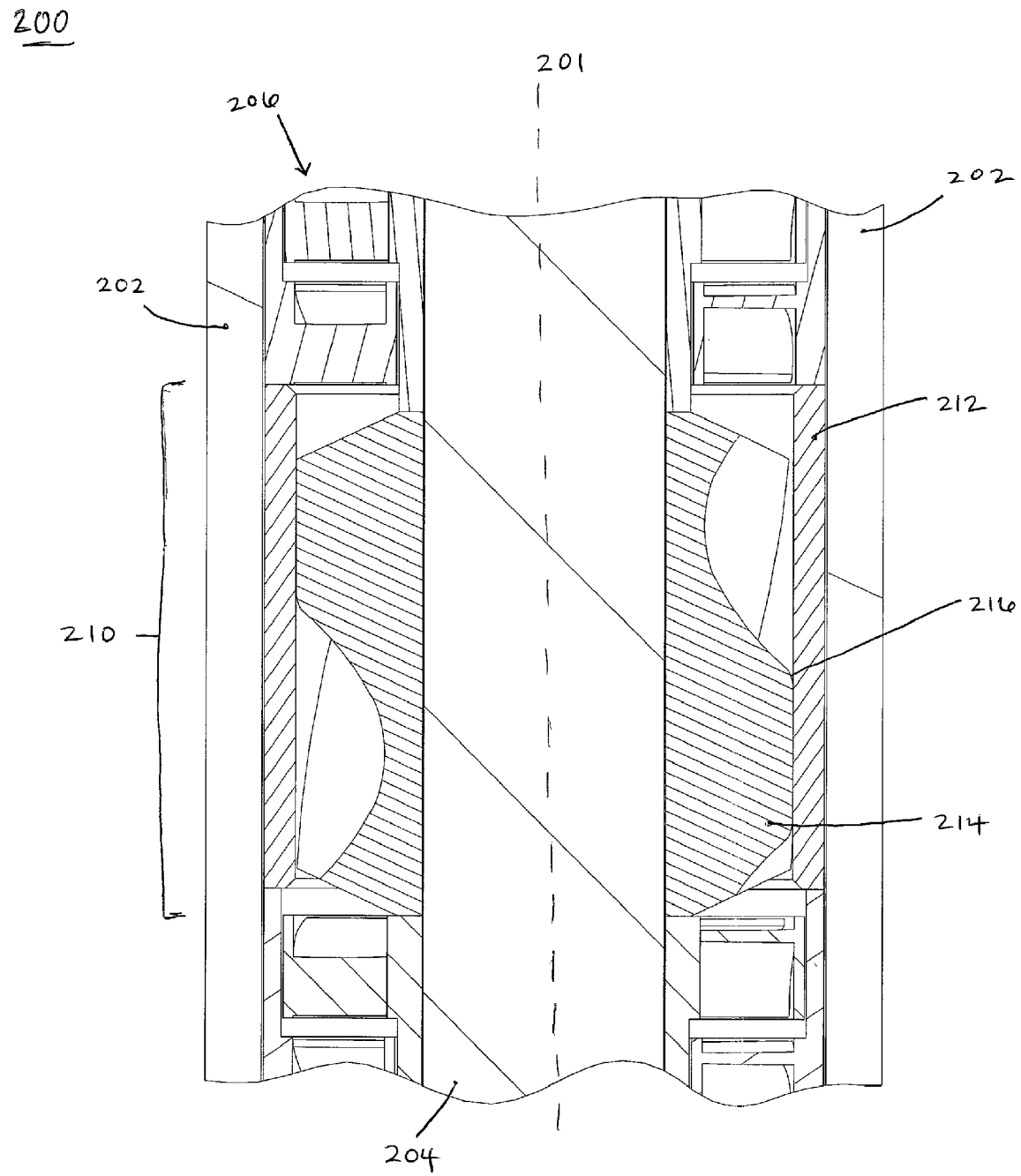
FIG. 2 illustrates a cross-sectional view of a drilling tool using a first radial bearing assembly in accordance with implementations of various techniques described herein.

FIG. 2 illustrates a cross-sectional view of a drilling tool 200 using a first radial bearing assembly 210 in accordance with implementations of various techniques described herein. In one implementation, the drilling tool 200 may have a housing 202, through which a housing bore 206 may extend along a longitudinal axis 201. A rotatable shaft 204 may be positioned in the housing bore 206, such that the shaft 204, the housing bore 206, and the housing 202 may be centered around the longitudinal axis 201. In addition, the shaft 204 may be rotatable relative to the housing 202. In a further implementation, the drilling tool 200 may be a turbodrill.

The first radial bearing assembly 210 may be disposed in the housing bore 206, where it may be positioned between the shaft 204 and an inner wall or surface of the housing 202. The first radial bearing assembly 210 may include a sleeve 214 coupled or mounted to the shaft 204, such that the sleeve 214 and the shaft 204 may rotate together. The first radial bearing assembly 210 may also include a bushing 212 disposed coaxially around the sleeve 214, where the bushing 212 may be configured to frictionally engage the inner wall or surface of the housing 202. In such a configuration, the bushing 212 may be prevented from rotating, allowing the sleeve 214 to rotate within the bushing 212. The first radial bearing assembly 210 may also include a clearance 216 or radial space located between an outer diameter of the sleeve 214 and an inner diameter of the bushing 212.

Figure 3:
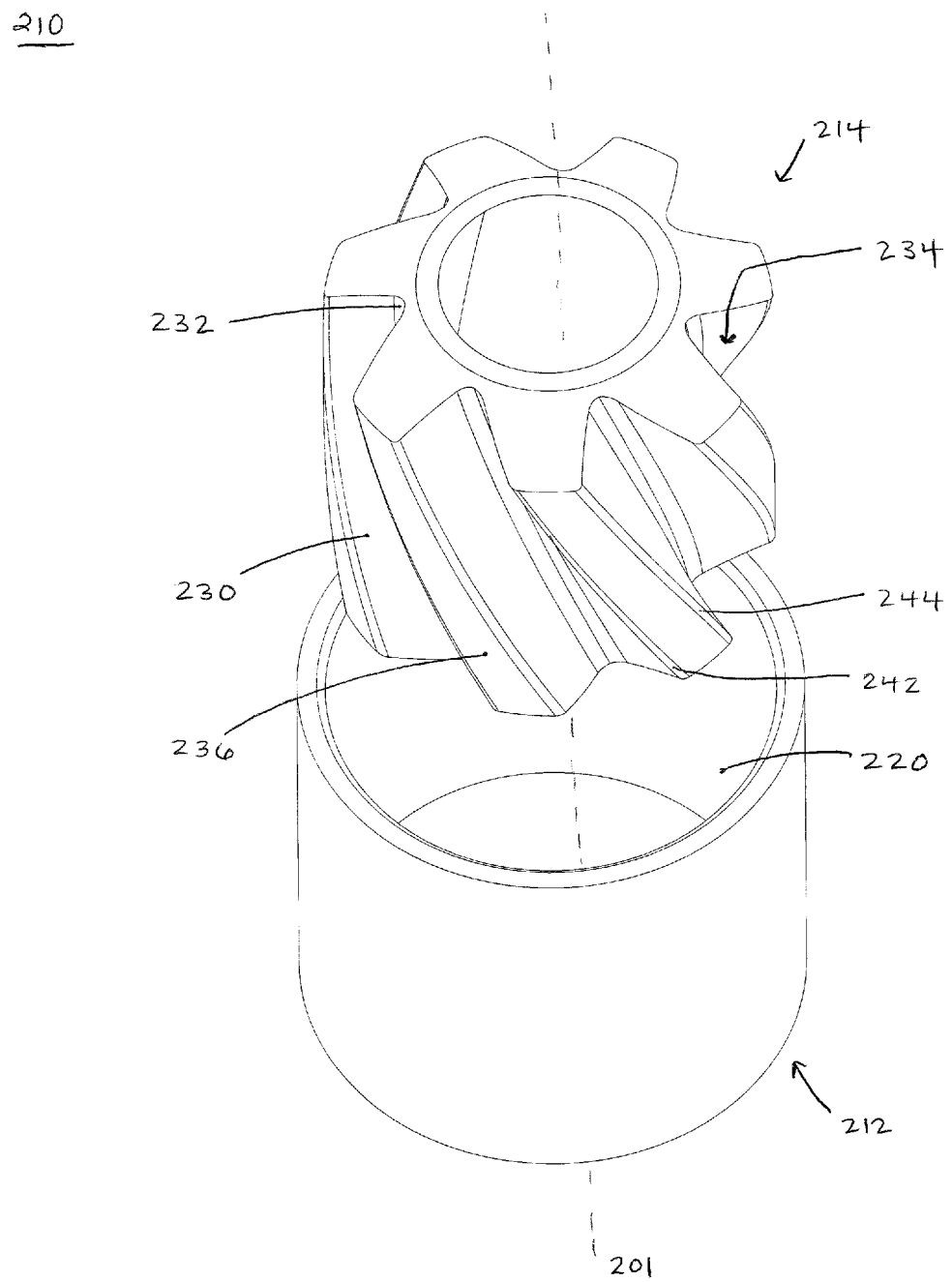
FIG. 3 illustrates an enlarged and exploded view of components of the first radial bearing assembly in accordance with implementations of various techniques described herein.

FIG. 3 illustrates an enlarged and exploded view of components of the first radial bearing assembly 210 in accordance with implementations of various techniques described herein. The bushing 212 may have a generally cylindrical body with an inner surface 220. The sleeve 214 may also have a generally cylindrical body for coupling or mounting to the shaft 204, where the sleeve 214 may include a plurality of spiral projections 230 extending generally laterally outwardly from the longitudinal axis 201. In one or more implementations, the spiral projections 230 may extend outwardly in a perpendicular direction away from the longitudinal axis 201. In one or more implementations, the spiral projections 230 may be configured in a substantially helical pattern relative to the longitudinal axis 201. The plurality of spiral projections 230 may be identical in size, shape, and orientation or the plurality of spiral projections 230 may vary in size, shape and orientation. In one or more implementations, the plurality of spiral projections 230 may be arranged equidistantly around the sleeve 214. The sleeve 214 may include 3 to 175 spiral projections 230.

Figure 4:
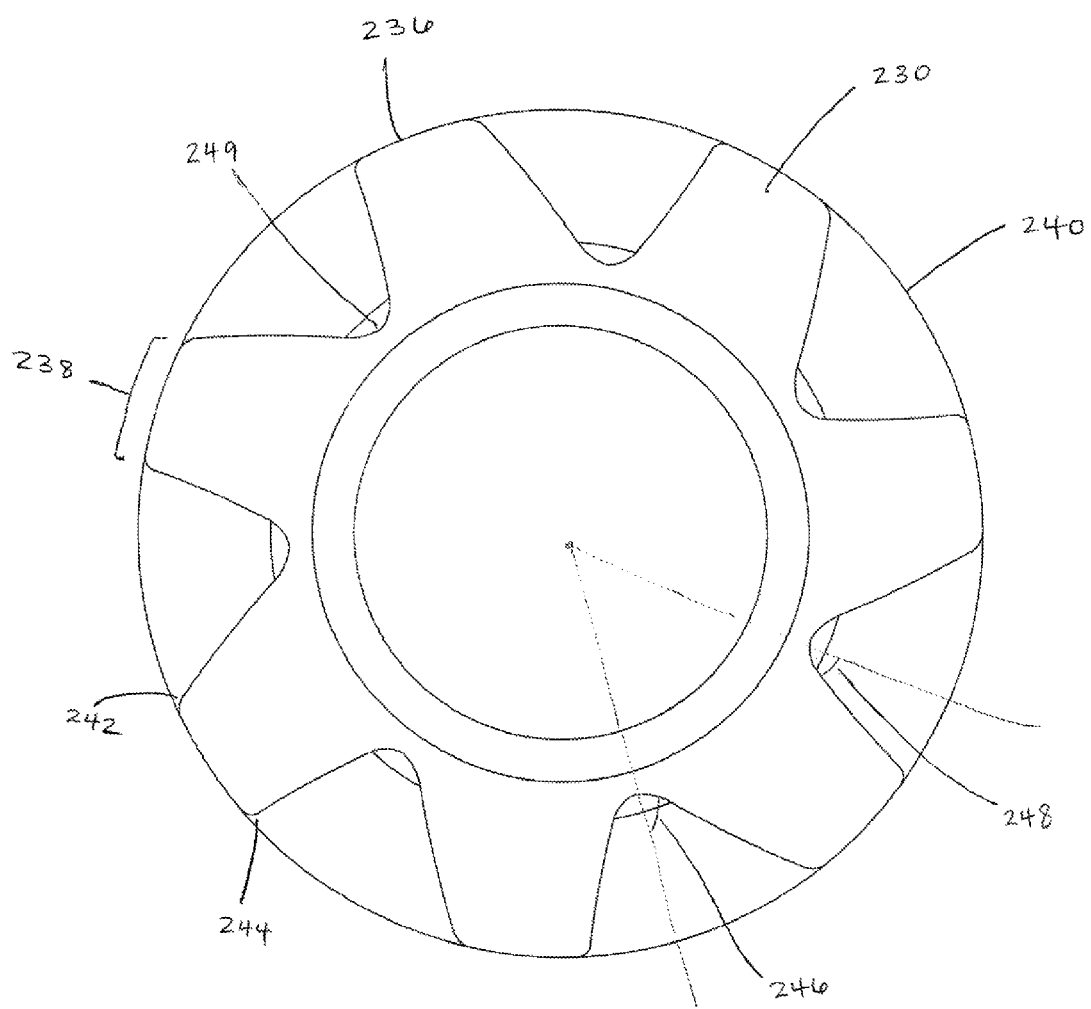
FIG. 4 illustrates a top view of the sleeve of the first radial bearing assembly in accordance with implementations of various techniques described herein.

Each spiral projection 230 may include an abutment surface 236, where the abutment surface 236 may represent an outermost diameter of each spiral projection 230, as measured laterally outwardly from the longitudinal axis 201. In one or more implementations, the abutment surface 236, for an entire length of the spiral projection 230, may lie along an outermost diameter 240 for the spiral projection 230 (as illustrated in FIG. 4). Accordingly, the abutment surface 236 may have a rounded, arc shape. In one or more implementations, the abutment surface 236 may have rounded edges 242 and 244, as further explained below with reference to FIG. 4.

The outer diameter of the sleeve 214 may be defined by the outermost diameter 240 for the spiral projection 230. Further, the clearance 216 may be located between the outermost diameter 240 for the spiral projection 230 and the inner diameter of the bushing 212. In one or more implementations, the clearance 216 may range from about 0.001 inches to about 0.1 inches.

A plurality of flow paths 234 may be formed along the outer surface 232 of sleeve 214, where each flow path may be formed between a pair of adjacent spiral projections 230. The flow paths 234 may be configured to allow drilling fluid to flow between the spiral projections 230. In one or more implementations, drilling fluid may be allowed to enter an uphole end portion of the first radial bearing assembly 210, flow through the plurality of flow paths 234, and exit the first radial bearing assembly 210 at a downhole end portion. The plurality of flow paths 234 may be configured in a substantially helical pattern relative to the longitudinal axis 201. The flow paths 234 may be identical in size, shape, and orientation (as shown) or the flow paths 234 may vary in size, shape, and orientation (not shown). The flow paths 234 may be arranged equidistantly around the sleeve 214.

FIG. 4 illustrates a top view of the sleeve 214 of the first radial bearing assembly 210 (FIG. 3) in accordance with implementations of various techniques described herein. As shown in FIG. 4, the spiral projections 230 all extend the same radial distance outwardly. Thus, the sleeve 214 has an outermost diameter represented by 240. The abutment surface 236 of the spiral projection 230 may have a rounded, arc shape, which may further define the outermost diameter 240.

A width 238 of each abutment surface 236 may be constant along an entire longitudinal length of each spiral projection 230. However, in one or more other implementations, width 238 may vary along a longitudinal length of each spiral projection 230. In one or more implementations, the width 238 of each abutment surface 236 may range from about 0.003 inches to about 4 inches. Further, each spiral projection 230 may include a first side edge 242 and a second side edge 244. Assuming that the sleeve 214 rotates in a clockwise direction in FIG. 4, the first side edge 242 may have a first side taper angle 246, and the second side edge 244 may have a second side taper angle 248. In one implementation, the first side edge 242 and the second side edge 244 may each have a radius ranging from about 0.001 inches to about 0.1 inches. In another implementation, the first side taper angle 246 and the second side taper angle 248 may each range from about 10 degrees to about 75 degrees. The sleeve 214 may also have a root radius 249 where adjacent spiral projections 230 meet around the sleeve 214. In one implementation, the root radius 249 may range from about 0.001 inches to about 0.1 inches.

Figure 5:
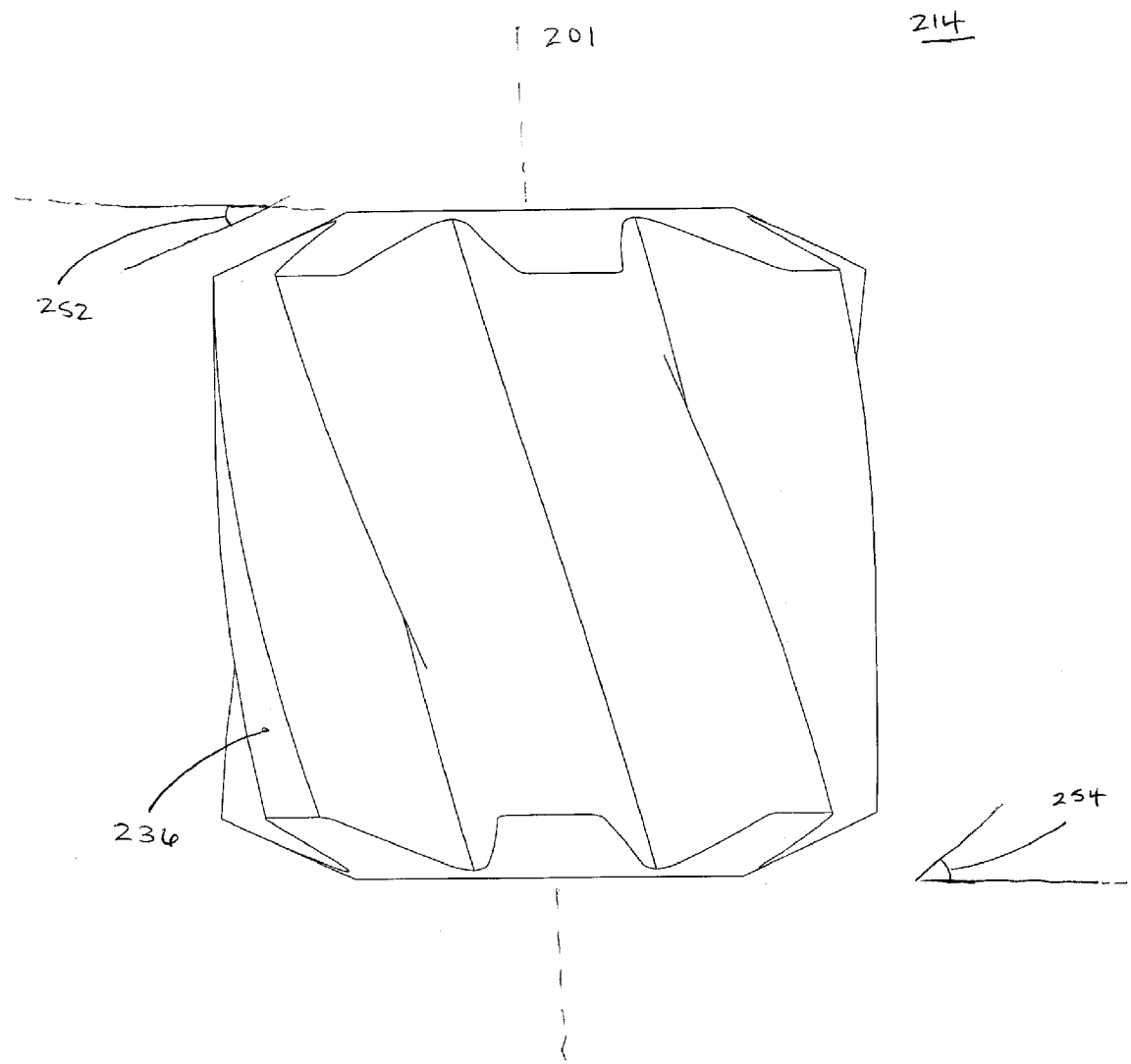
FIG. 5 illustrates a side view of the sleeve of the first radial bearing assembly in accordance with implementations of various techniques described herein.

FIG. 5 illustrates a side view of the sleeve 214 of the first radial bearing assembly 210 (FIG. 3) in accordance with implementations of various techniques described herein. In one implementation, a pitch orientation of the first radial bearing assembly 210 may range from about 5 inches to about 25 inches at a 360 degree implementation.

In another implementation, an uphole end portion of the abutment surface 236 may be tapered at a leading edge angle 252, and a downhole end portion of the abutment surface 236 may be tapered at a trailing edge angle 254. The leading edge angle 252 and the trailing edge angle 254 may be measured relative to a line perpendicular to the longitudinal axis 201. In one implementation, the leading edge angle 252 may be the same size as the trailing edge angle 254. In another implementation, the leading edge angle 252 and/or the trailing edge angle 254 may each range from about 0 degrees to about 45 degrees.

Second Radial Bearing Assembly

Figure 6:
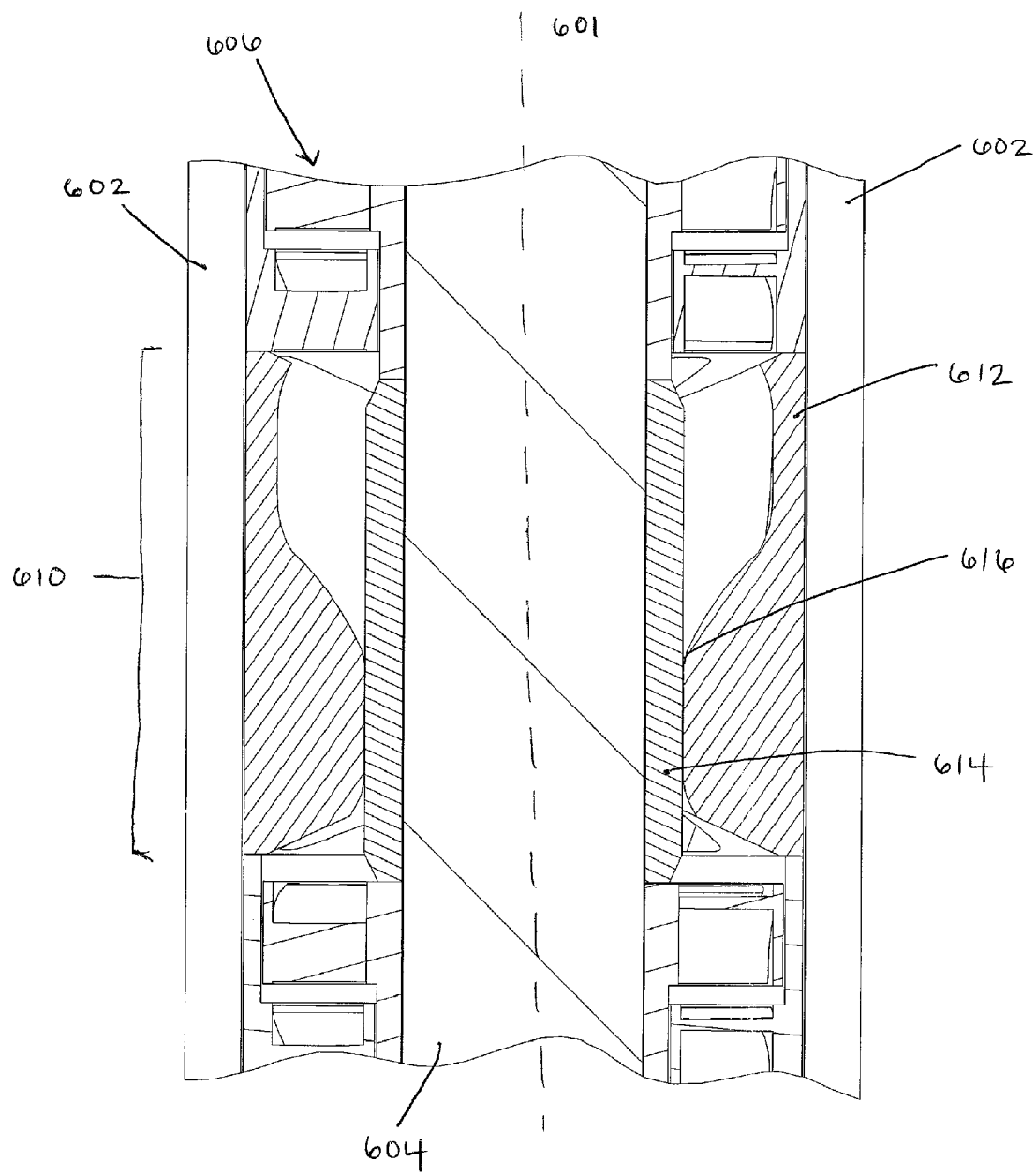
FIG. 6 illustrates a cross-sectional view of a drilling tool using a second radial bearing assembly in accordance with implementations of various techniques described herein.

FIG. 6 illustrates a cross-sectional view of a drilling tool 600 using a second radial bearing assembly 610 in accordance with implementations of various techniques described herein. The drilling tool 600 may be comparable to the drilling tool 200 of FIG. 2. In particular, housing 602, housing bore 606, longitudinal axis 601, and rotatable shaft 604 are comparable to housing 202, housing bore 206, longitudinal axis 201, and rotatable shaft 204. In one implementation, both the first radial bearing assembly 210 and the second radial bearing assembly 610 may be used in the same drilling tool, e.g., 200 or 600.

The second radial bearing assembly 610 may be disposed in the housing bore 606, where it may be positioned between the shaft 604 and an inner wall or surface of the housing 602. The second radial bearing assembly 610 may include a sleeve 614 coupled or mounted to the shaft 604, such that the sleeve 614 and the shaft 604 may rotate together. The second radial bearing assembly 610 may also include a bushing 612 disposed coaxially around the sleeve 614, where the bushing 612 may be configured to frictionally engage the inner wall or surface of the housing 602. In such a configuration, the bushing 612 may be prevented from rotating, allowing the sleeve 614 to rotate within the bushing 612. The second radial bearing assembly 610 may also include a clearance 616 or radial space located between an outer diameter of the sleeve 614 and an inner diameter of the bushing 612.

Figure 7:
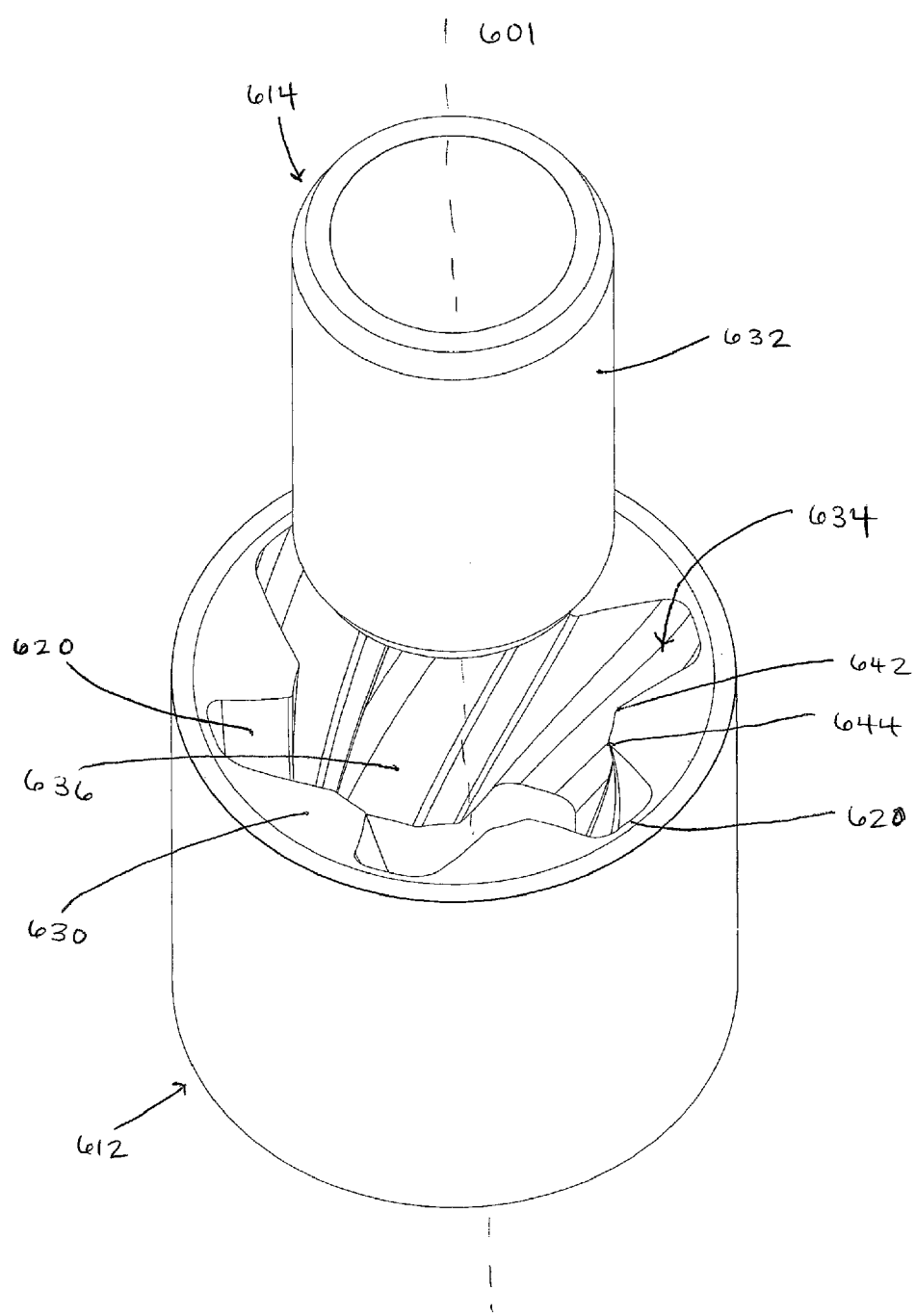
FIG. 7 illustrates an enlarged and exploded view of components of the second radial bearing assembly in accordance with implementations of various techniques described herein.

FIG. 7 illustrates an enlarged and exploded view of components of the second radial bearing assembly 610 in accordance with implementations of various techniques described herein. The sleeve 614 may have a generally cylindrical body with an outer surface 632. The bushing 612 may also have a generally cylindrical body with an inner surface 620. The bushing 612 may include a plurality of spiral projections 630 extending generally laterally inwardly toward the longitudinal axis 601. In one or more implementations, the spiral projections 630 may extend inwardly in a perpendicular direction toward the longitudinal axis 601. In one or more implementations, the spiral projections 630 may be configured in a substantially helical pattern relative to the longitudinal axis 601. The plurality of spiral projections 630 may be identical in size, shape, and orientation or the plurality of spiral projections 630 may vary in size, shape, and orientation. In one or more implementations, the plurality of spiral projections 630 may be arranged equidistantly along the inner surface 620. The bushing 612 may include 3 to 175 spiral projections 630.

Figure 8:
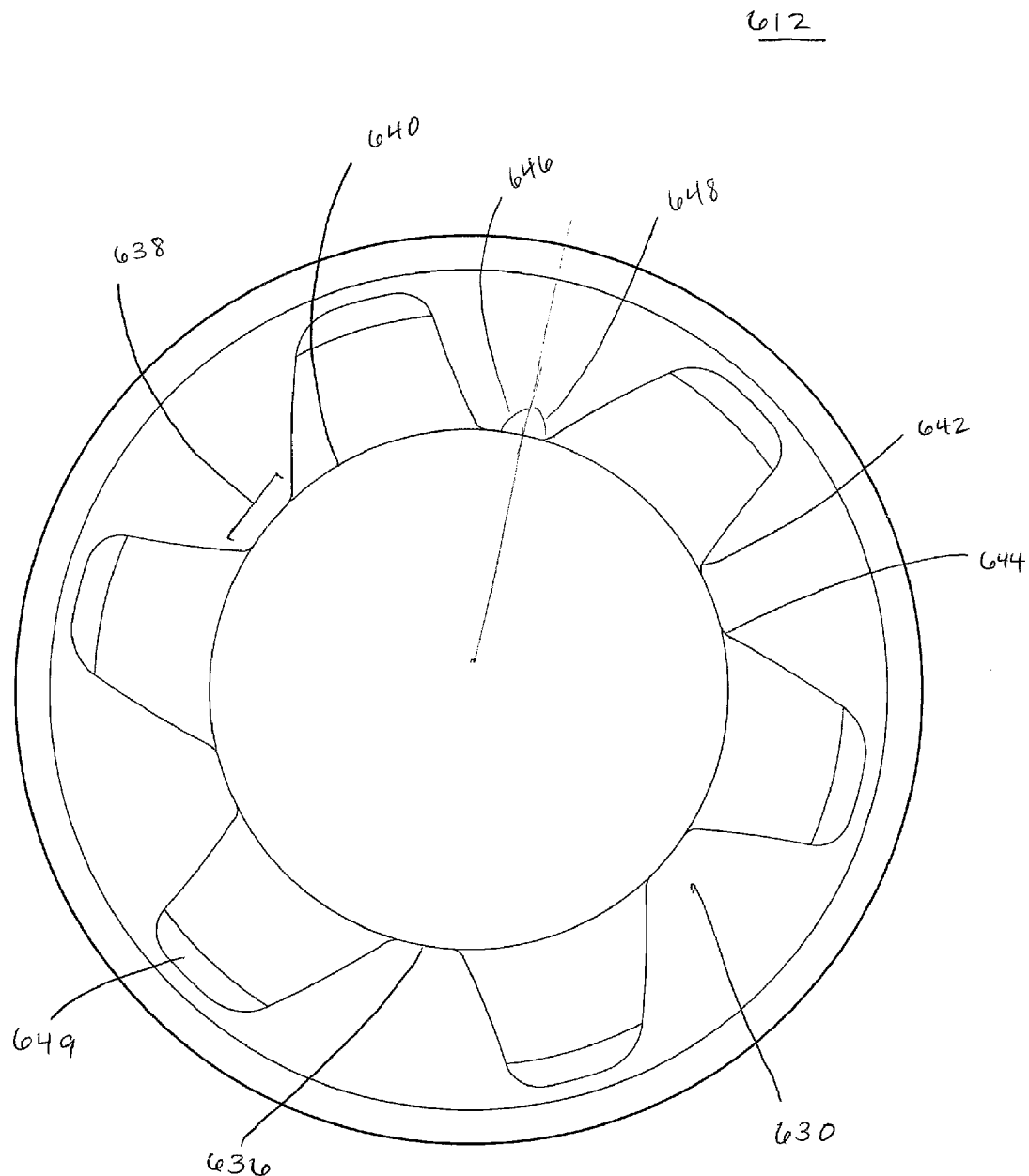
FIG. 8 illustrates a top view of the bushing of the second radial bearing assembly in accordance with implementations of various techniques described herein.

Each spiral projection 630 may include an abutment surface 636, where the abutment surface 636 may represent an innermost diameter of each spiral projection 630, as measured laterally inwardly toward the longitudinal axis 601. In one or more implementations, the abutment surface 636, for an entire length of the spiral projection 630, may lie along the innermost diameter 640 for the spiral projection 630 (as illustrated in FIG. 8). Accordingly, the abutment surface 636 may have a rounded, arc shape. In addition, the abutment surface 636 may have rounded edges 642 and 644.

In one or more implementations, an inner diameter of the bushing 612 may be defined by the innermost diameter 640 for the spiral projection 630. Further, the clearance 616 may be located between the innermost diameter 640 for the spiral projection 630 and the outer diameter of the sleeve 614. In one implementation, the clearance 616 may range from about 0.001 inches to about 0.1 inches.

A plurality of flow paths 634 may be formed along the inner surface 620 of bushing 612, where each flow path may be formed between a pair of adjacent spiral projections 630. The flow paths 634 may operate and may be arranged similarly to flow paths 234.

FIG. 8 illustrates a top view of the bushing 612 of the second radial bearing assembly 610 in accordance with implementations of various techniques described herein. As shown in FIG. 8, the spiral projections 630 all extend the same radial distance inwardly. Thus, the bushing 612 has an innermost diameter represented by 640.

As will be readily understood by those of ordinary skill in the art, width 638, first side edge 642, second side edge 644, first side taper angle 646, second side taper angle 648, and root radius 649 may be similar to (or analogous to) the width 238, the first side edge 242, the second side edge 244, the first side taper angle 246, the second side taper angle 248, and the root radius 249 of FIG. 4.

Figure 9:
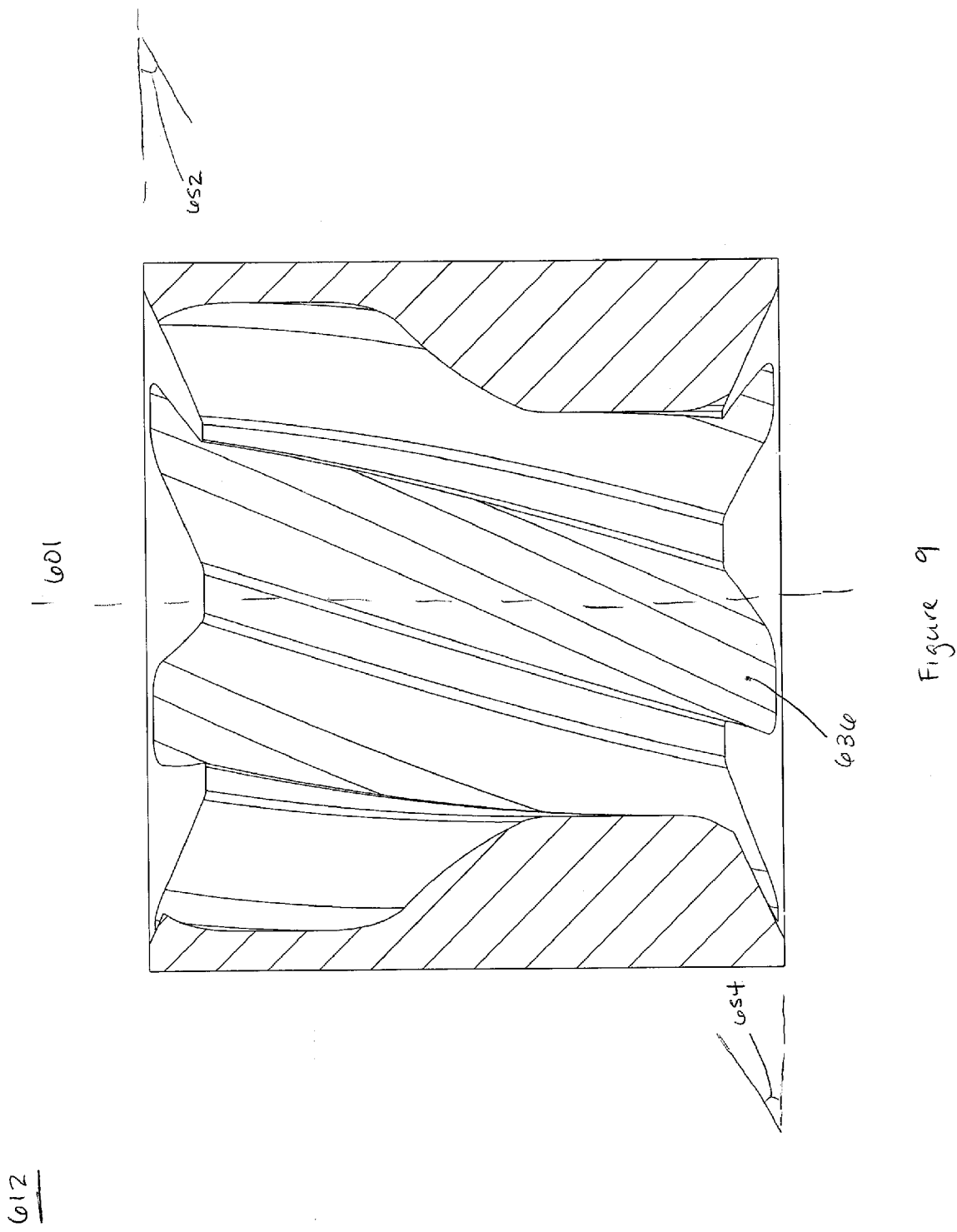
FIG. 9 illustrates a side view of the bushing of the second radial bearing assembly in accordance with implementations of various techniques described herein.

FIG. 9 illustrates a side view of the bushing 612 of the second radial bearing assembly 610 in accordance with implementations of various techniques described herein. As will be readily understood by those of ordinary skill in the art, pitch orientation, leading edge angle 652, and trailing edge angle 654 of FIG. 9 may be similar to (or analogous to) the pitch orientation, the leading edge angle 252, and the trailing edge angle 254 of FIG. 5.

Radial Bearing Assembly Construction

The abutment surfaces may be configured to contact the other components (e.g., sleeve, bushing, etc.) of a radial bearing assembly during operation of a drilling tool. Accordingly, a coating of either an elastomeric material or a metallic material may be applied to the abutment surface 236 (sleeve 214) and the inner surface 220 (bushing 212) of the first radial bearing assembly 210 and/or the abutment surface 636 (bearing 612) and the outer surface 632 (sleeve 614) of the second radial bearing assembly 610.

In one or more implementations, the coating may be applied to the sleeve 214 of the first radial bearing assembly 210 such that the coating covers the outer surface 232, including the spiral projections 230 along the abutment surfaces 236 and the flow paths 234. Further, the coating may be applied to the bushing 612 of the second radial bearing assembly 610 such that the coating covers the inner surface 620, including the spiral projections 630 along the abutment surfaces 636 and the flow paths 634. In one or more implementations, the coating may be applied to the sleeve 214 of the first radial bearing assembly 210 such that coating itself forms the spiral projections 230. Likewise, the coating may be applied to the bushing 612 of the second radial bearing assembly 610 such that the coating itself forms the spiral projections 630.

The elastomeric material may include a rubber coating, a thermal oxide coating, or any other suitable material known to those skilled in the art. The elastomeric material may also be constructed using crystalline or amorphous-based powders and processes of coating, such as those relating to carbon, diamond-like carbon, cubic boron nitride, polymers, or any other suitable material known to those skilled in the art. Elastomeric material may be used with water-based drilling fluid and/or high bend drilling.

The metallic material may include a hard metal coating, a hard chrome coating, or any other suitable material known to those skilled in the art. The metallic material may also be constructed using nickel, cobalt, iron, chromium, or tungsten-based powders, or any other suitable material known to those skilled in the art. Metallic material may be used with oil or synthetic oil-based drilling fluid and/or at elevated temperature regions.

In the first radial bearing assembly 210 and/or the second radial bearing assembly 610, the bushing and the sleeve may be constructed of the same material without using any coating. For example, the bushing 212, 614 and the sleeve 214, 614 of the radial bearing assembly 210, 610 may be constructed in whole of a carbide, including, but not limited to, tungsten carbide, silicon carbide, aluminum nitride, titanium nitride, or boron carbide.

The coating of elastomeric or metallic material on only the abutment surfaces of spiral projections and surface areas of the bushing or sleeve may allow the subsequent reapplication of the coating to become a more efficient and cost effective process. Further, constructing blanks of elastomeric and/or metallic radial bearings with similar designs, prior to coating, may simplify inventory upkeep and/or save coating costs.

In sum, the radial bearing assemblies described above with respect to FIGS. 1-9 allow for improved hydraulics while helping to keep a rotatable shaft concentric within a drilling tool. The extent to which hydraulics may be improved within the radial bearing assemblies may be dependent upon dimensions and parameters, such as the number of spiral projections, the width of the spiral projections, the radii of side edges, and other parameters known to those skilled in the art.

The improved hydraulics may provide the drilling fluid a sufficient time and medium to dissipate frictional heat within the radial bearing assembly. In particular, wear, cracking, and/or other damage to components of the radial bearing assembly may be slowed. Penetration of abrasive particles and subsequent chunking of a bushing and/or sleeve may also be reduced. The improved hydraulics may also lead to less frequent frictional welding of the bushing and the sleeve within the radial bearing assembly. Further, the improved hydraulics may lead to increased hydraulic energy and power generated from the drilling tool and more drilling fluid reaching downhole components of the drilling tool.

While the foregoing is directed to implementations of various techniques described herein, other and further implementations may be devised without departing from the basic scope thereof. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A radial bearing assembly for use in a drilling tool, comprising:
a bushing having a generally cylindrical body with an inner surface; and
a sleeve configured to couple to a rotatable shaft of the drilling tool and configured to rotate within the bushing, the sleeve having (i) a plurality of spiral projections extending laterally in a direction away from a longitudinal axis of the radial bearing assembly and (ii) a plurality of flow paths, wherein a flow path of the plurality of flow paths is defined between a pair of adjacent spiral projections.

2. The radial bearing assembly of claim 1, wherein the plurality of spiral projections are substantially helical with respect to the longitudinal axis of the radial bearing assembly.

3. The radial bearing assembly of claim 1, wherein the flow paths are configured to allow fluid to pass between the plurality of spiral projections from an upper end portion of the sleeve to a lower end portion of the sleeve.

4. The radial bearing assembly of claim 1, further comprising a clearance formed between an outer diameter of the plurality of spiral projections and an inner diameter of the bushing.

5. The radial bearing assembly of claim 1, wherein each spiral projection comprises an abutment surface positioned on an outer diameter of each spiral projection.

6. The radial bearing assembly of claim 5, wherein a first side edge and a second side edge of each abutment surface are tapered.

7. The radial bearing assembly of claim 5, wherein a protective coating is applied to each abutment surface and to the inner surface of the bushing.

8. The radial bearing assembly of claim 1, wherein the bushing and the sleeve are constructed using the same material without use of a coating.

9. The radial bearing assembly of claim 1, wherein the drilling tool includes a mud motor and the rotatable shaft is a rotatable shaft inside a mud motor, the first sleeve being configured to rotate within a housing of the mud motor.

10. The radial bearing assembly of claim 9, wherein the plurality of flow paths are configured to receive fluid flowing in a downhole direction through the mud motor.

11. The radial bearing assembly of claim 1, a distance between uphole and downhole end portions of the bushing being about equal to a distance between uphole and downhole end portions of the sleeve.

12. The radial bearing assembly of claim 1, the radial bearing consisting of the bushing and the sleeve.

13. A downhole tool, comprising:
a mud motor including:
a housing having a housing bore extending therethrough;
a rotatable shaft positioned in the housing bore, the shaft being rotatable relative to the housing, the housing, the housing bore and the rotatable shaft having a common longitudinal axis; and
a first radial bearing assembly within the housing, including:
a first bushing having a generally cylindrical body with a first inner surface; and
a first sleeve coupled to the shaft and configured to rotate within and relative to the first bushing, the first sleeve having (i) a plurality of first spiral projections extending laterally outwardly in a direction away from the longitudinal axis and (ii) a plurality of first flow paths, wherein a first flow path of the plurality of first flow paths is defined between a pair of adjacent first spiral projections.

14. The downhole tool of claim 13, the first bushing having an outer surface frictionally engaging the housing.

15. The downhole tool of claim 14, the first bushing being prevented from rotating relative to the housing.

16. The downhole tool of claim 13, the rotatable shaft extending through the first bushing and the first sleeve.

17. The downhole tool of claim 13, further comprising:
at least one stabilizer on an outer surface of the housing.

* * * * *